United States Patent [19]

Kemmochi et al.

[11] Patent Number: 5,148,287
[45] Date of Patent: Sep. 15, 1992

[54] IMAGE PROCESSING APPARATUS WITH GOOD HIGHLIGHT REPRODUCTION

[75] Inventors: Kazuhisa Kemmochi, Yokohama; Yukio Nagase, Kawasaki, both of Japan

[73] Assignee: Canon Kabushiki Kaisha, Tokyo, Japan

[21] Appl. No.: 423,383

[22] Filed: Oct. 19, 1989

[30] Foreign Application Priority Data

Oct. 20, 1988 [JP] Japan .................. 63-262825
Jan. 23, 1989 [JP] Japan .................. 1-011850

[51] Int. Cl.⁵ .................................. H04N 1/23
[52] U.S. Cl. ................... 358/298; 358/456; 358/457; 358/458
[58] Field of Search ......... 346/1.1, 108, 160; 340/728; 358/298, 455, 456, 465, , 466, 300, 457, 458

[56] References Cited

U.S. PATENT DOCUMENTS

| | | | |
|---|---|---|---|
| 4,196,454 | 4/1980 | Warren | 358/298 |
| 4,553,173 | 11/1985 | Kawamura | 358/298 |
| 4,561,025 | 12/1985 | Tsuzuki | 358/298 |
| 4,578,713 | 3/1986 | Tsao et al. | 358/298 |
| 4,680,645 | 7/1987 | Dispoto et al. | 346/1.1 |
| 4,709,250 | 11/1987 | Takeuchi . | |
| 4,733,230 | 3/1988 | Kurihara et al. | 340/728 |
| 4,763,199 | 8/1988 | Suzuki . | |
| 4,782,398 | 11/1988 | Mita et al. | 358/298 |
| 4,783,837 | 11/1988 | Kawamura et al. . | |
| 4,800,442 | 1/1989 | Riseman et al. | 358/298 |
| 4,811,037 | 3/1989 | Arai . | |
| 4,819,066 | 4/1989 | Miyagi . | |
| 4,847,654 | 7/1989 | Honma et al. . | |
| 4,847,695 | 7/1989 | Arai . | |

FOREIGN PATENT DOCUMENTS

| | | |
|---|---|---|
| 43-16199 | 7/1965 | Japan . |
| 50-119639 | 9/1975 | Japan . |
| 53-93030 | 8/1978 | Japan . |
| 63-293062 | 11/1988 | Japan . |

Primary Examiner—Benjamin R. Fuller
Assistant Examiner—Scott A. Rogers
Attorney, Agent, or Firm—Fitzpatrick, Cella, Harper & Scinto

[57] ABSTRACT

In an image processing apparatus according to the present invention, the density of each pixel in a multi-level pixel block composed of a set of input multi-level pixel data is examined and a decision is made as to whether a pixel having a density which does not reach the minimum density below which printing is impossible, is present in the multi-level pixel block. If a pixel having a density below the minimum density is detected, the density of this pixel is distributed to another pixel position in the multi-level pixel block. In this manner, the number of pixels with a density which does not reach the minimum density below which printing is impossible, is reduced within each multi-level pixel block.

15 Claims, 14 Drawing Sheets

| 8 | 5 | 7 |
|---|---|---|
| 2 | 1 | 3 |
| 6 | 4 | 9 |

MAIN SCAN →

INPUT PIXEL SIGNAL A

|   | 1 | 2 | 3 | 4 | 5 | 6 |
|---|---|---|---|---|---|---|
| 1 | 10 G11 | 30 G12 | 60 G13 | 90 G14 | 80 G15 | 60 G16 |
| 2 | 20 G21 | 40 G22 | 60 G23 | 100 G24 | 70 G25 | 50 G26 |

Fig. 8A

MAIN SCAN →

OUTPUT PIXEL SIGNAL B

|   | 1 | 2 | 3 | 4 | 5 | 6 |
|---|---|---|---|---|---|---|
| 1 | 33 G11 | 33 G12 | 60 G13 | 90 G14 | 80 G15 | 60 G16 |
| 2 | 0 G21 | 33 G22 | 60 G23 | 100 G24 | 70 G25 | 50 G26 |

INPUT PIXEL SIGNAL A

MAIN SCAN →

| | 1 | 2 | 3 | 4 | 5 | 6 |
|---|---|---|---|---|---|---|
| 1 | 10 (G11) | 30 (G12) | 60 (G13) | 90 (G14) | 100 (G15) | 20 (G16) |
| 2 | 20 (G21) | 40 (G22) | 60 (G23) | 100 (G24) | 110 (G25) | 70 (G26) |

Fig. 15B

OUTPUT PIXEL SIGNAL B

MAIN SCAN →

| | 1 | 2 | 3 | 4 | 5 | 6 |
|---|---|---|---|---|---|---|
| 1 | 100 (G11) | 0 (G12) | 60 (G13) | 90 (G14) | 255 (G15) | 0 (G16) |
| 2 | 0 (G21) | 0 (G22) | 60 (G23) | 100 (G24) | 0 (G25) | 45 (G26) |

Fig. 15C

| 0 (G11) | 30 (G12) | 60 (G13) | 90 (G14) | 100 (G15) | 0 (G16) |
|---|---|---|---|---|---|
| 30 (G21) | 40 (G22) | 60 (G23) | 100 (G24) | 110 (G25) | 90 (G26) |

IMAGE PROCESSING APPARATUS WITH GOOD HIGHLIGHT REPRODUCTION

BACKGROUND OF THE INVENTION

1. Field of the Invention

The present invention relates to an image processing apparatus and, more particularly, to an image processing apparatus for producing a half-tone image from input multi-level image data (image data in which each pixel is represented by more than one bit).

2. Description of the Related Art

Laser beam printers of the type which utilize electrophotographic processes have recently received attention as one type of high speed and low-noise printer. Such a laser beam printer is typically used for recording characters, line drawings, figures or the like. Since characters, figures or the like are so called binary level images which are represented by only two states—black and white,—they need not be reproduced in halftone and the structures of printers for this purpose can therefore be made simple.

Several methods of reproducing halftone images by means of binary recording apparatus have been proposed and, for example, a dither method and a density pattern method are well known. However, as publicly known, it is difficult to realize high resolution by using printers of the type employing the dither method or the density pattern method. In such a situation, developments have recently been directed to printers capable of reproducing halftone while performing binary level recording by means of semiconductor lasers adapted to be driven with image signals whose pulse duration is varied by pulse width modulation (PWM). With the PWM method, it is possible to print out images which excel in resolution and tone representation. This PWM method is indispensable to, particularly, color-image printers.

However, the laser beam printers utilizing the PWM processes offer various types of new problems.

One problem, although inherent in the electrophotographic process, is the instability of the density of an image printed by the electrophotographic process. Another problem resides in difficulties which may occur when the semiconductor laser is driven with pulse width modulation.

These problems are explained in detail below.

FIG. 11 shows the general structure of an electrophotographic type of printer mechanism.

The illustrated printer mechanism comprises a photosensitive drum 301 which is rotated about a shaft 309 in the direction indicated by the arrow shown on the drum, a charger 302, a developer 303, a transfer charger 304, a cleaning device 305, and an optical section disposed above the photosensitive drum 301 as viewed in the figure. The charger 302, the developer 303, the transfer charger 304, and the cleaning device 305 are disposed around the photosensitive drum 301 in the order shown in the figure.

This optical section comprises a semiconductor laser unit 306, a polygon mirror 307 which rotates at a fixed high speed, an f−θ lens 308, a light shielding board, and the like. An image signal is obtained by applying a PWM process to a time-series digital pixel signal which is, after arithmetic operations, output from an image reader, an electronic computer or the like, which is not shown. The image signal is then supplied to the semiconductor laser unit 306. The semiconductor laser unit 306 irradiates the polygon mirror 307 with a laser beam according to the on/off states of the image signal. Since the polygon mirror 307 is rotating at fixed high speed, the laser beam, which has irradiated one face of the polygon mirror 307, scans (exposes) the drum surface at a location between the charger 302 and the developer 303 in such a manner that the beam spot travels along the longitudinal axis of the photosensitive drum 301 from the front toward the rear as viewed in FIG. 11.

In general, the characteristics, such as exposure sensitivity, residual potential and the like, of the photosensitive drum 301 change due to aging and changes in environment. In addition, developing agents (toner or the like) in the developer 303 undergo changes in the amount of electric charge they can build up or retain or the like, and such a change seriously affects development density. This is the problem of density instability which is inherent in the electrophotographic process, and has severe effects on the formation of a fine level of density in the PWM-type laser beam printer.

There is another problem in that, as shown in, for example FIG. 13, the relationship between the electric current and the power level P of the laser beam which are supplied from the semiconductor laser depends upon the ambient temperature.

To cope with these problems, various proposals have been made with respect to a method of providing a stable tonal image by properly controlling the above fluctuation factors. Typical known techniques disclosed in, for example, Japanese Patent Publication No. 43-6199, and Japanese Patent Laid-Open Application Nos. 53-93030 and 50-9639. Although the detailed explanation of them is omitted, even if any of these proposals is adopted, the problem of a deterioration in the image quality of a highlight portion still remains, which problem is to be solved by the present invention.

FIG. 9 is a circuit diagram showing one example of a PWM circuit, FIG. 10 is a circuit diagram of a laser driver circuit, and FIG. 12 is a timing chart showing the operation of the PWM circuit.

In FIG. 9, reference numeral 401 denotes a TTL latch circuit for latching an 8 bit image signal, reference numeral 402 a level converter for converting a TTL logic level into a high-speed ECL logic level, reference numeral 403 an ECL digital-to-analog converter, reference numeral 404 an ECL comparator for generating a PWM signal, reference numeral 405 a level converter for converting an ECL logic level into a TTL logic level, reference numeral 406 a clock oscillator for generating a clock signal 2f of frequency which is double the frequency of a pixel clock signal f, reference numeral 407 a triangular-wave-signal generator for generating an approximately ideal triangular wave signal in synchronization with the clock signal 2f, reference numeral 408 a divide-by-two frequency divider for dividing the clock signal 2f by two. Although not shown, ECL circuits are disposed at appropriate locations in order to cause the circuit to operate at high speed.

The operation based on the above construction is explained with reference to FIG. 12.

A signal (a) indicates the clock signal 2f, and a signal (b) indicates the pixel clock signal f whose period is twice that of the clock signal 2f. As illustrated, the waveforms of these signals (a) and (b) are associated with pixel signals. Within the triangular-wave-signal generator 407, the clock signal 2f is divided by two to generate a triangular wave signal (c) so that the duty ratio of the triangular wave signal can be kept 50%. Then, this triangular wave signal (c) (not indicated in FIG. 9) is converted into an ECL level (0 to −1V) to form a triangular signal (d).

The image signal latched by the latch circuit 401 changes from 00H (white) to FFH (black) in 256 steps of tone representation Incidentally, "H" indicates hexadecimal notation The image signal (e) indicates ECL voltage levels which are obtained by subjecting the values of several image signals to D/A conversion in the D/A converter 403. For example, a period corresponding to the first pixel indicates FFH, representing a black pixel level, a period corresponding to the second pixel 80H, representing a halftone level, a period corresponding to the third pixel 40H, representing a halftone level, and a period corresponding to the fourth pixel 20H, representing a halftone level. The comparator 404 compares the triangular signal (d) with the image signal (e) to generate a PWM signal of pulse width T, $t_2$, $t_3$, $t_4$, etc. This PWM signal is translated into a TTL level of 0V or 5V to form a PWM signal (f), which is in turn supplied to the laser driver circuit 500.

In FIG. 10, a constant-current type of laser driver circuit is denoted by 500, and a semiconductor laser device by 501. This semiconductor laser device 501 is arranged to emit laser light when a switching transistor 502 is on and to stop the emission of laser light when the transistor 502 is off. This transistor 502 and a transistor 504 form as a pair, a current switching circuit to control, in accordance with the input PWM signal (f), the on/off switching (commutation) of a constant current to be supplied to the semiconductor laser device 501. This constant current is variable and the value of the constant current is determined by converting the input 8 bit value of the laser power into an analog voltage by means of the D/A converter 503 and comparing the analog voltage with a reference voltage.

The response characteristics of this laser beam involve the following problems. Referring to FIG. 12, when it is assumed that the maximum emission time per pixel is T (in seconds), if the pulse width of a PWM signal changes between 0 to T seconds, then it is theoretically preferable that the semiconductor laser device 501 emit a laser beam for only a time period accurately corresponding to this pulse width. In practice, however, because the PWM signal passes through the semiconductor laser device 501 and its drive circuit 500, an actual signal, which serves to drive the laser device, assumes the waveform (g) shown in FIG. 12, with the result that the emission of the laser beam is started or stopped with a certain amount of response delay. If the pulse width is T or $t_2$, this response delay is no problem, but, in the case of the pulse width $t_3$, the laser beam is not perfectly on. Further, in the case of the pulse width $t_4$, the semiconductor laser device 501 does not operate in practice. A beam effect (h) two-dimensionally indicates the state of emission of laser beams. Since the first pixel is black, the laser beam is on over the time period corresponding to one pixel. However, if the pulse width of the PWM signal becomes extremely short, for example $t_3 = 10$ ns, no laser beam may be emitted. Even if a laser beam is emitted, in such case it is extremely unstable in terms of the formation of an image by the electrophotographic process, and a stable density is no longer reproduced. As is apparent from the foregoing, the minimum pulse width which allows a satisfactory degree of density to be formed in tonal representation utilizing the PWM method has not yet reached a low enough limit. If this limit is $t_3 = 10$ ns, tone corresponding to all the pulse width not exceeding 10 ns (a highlight portion) will be represented in white.

SUMMARY OF THE INVENTION

It is, therefore, an object of the present invention to provide an improvement in an image processing apparatus for subjecting input multi-level image data to a predetermined tonal process.

It is another object of the present invention to provide an image processing apparatus capable of outputting a high-quality image.

It is another object of the present invention to provide an image processing apparatus capable of solving the prior art problems described above.

It is another object of the present invention to provide an image processing apparatus which produces a high quality image with a simple construction.

It is another object of the present invention to provide an image processing apparatus capable of forming a high-quality output image with a highlight portion of stable density.

To achieve the above objects, in accordance with the present invention, there is provided an image processing apparatus of the type which is connected to a printing device for printing a tonal image on the basis of multi-level pixel data input thereto, which apparatus comprises:

inputting means for inputting a multi-level pixel block composed of a set of multi-level pixel data; comparing means for making a comparison between a predetermined threshold and the density of each pixel within the input multi-level pixel block; detecting means for detecting whether a pixel having a density not exceeding the predetermined threshold is present in the multi-level pixel block on the basis of the result of the comparison made by the comparing means; density distributing means for distributing the densities of the pixels within the multi-level pixel block when the detecting means has detected a pixel having a density not exceeding the predetermined threshold; and outputting means for outputting the multi-level pixel data on each pixel within the multi-level pixel block.

It is yet another object of the present invention to provide an image processing apparatus capable of forming a high-quality output image with a highlight portion of stable density.

To achieve this object, in accordance with the present invention, there is provided an image processing apparatus which comprises: inputting means for inputting a pixel block composed of a set of multi-level pixel data; comparing means for making a comparison between a predetermined threshold and the density of each pixel within the input multi-level pixel block; detecting means for detecting whether a pixel having a density not exceeding the predetermined threshold is present in the multi-level pixel block on the basis of the result of the comparison made by the comparing means; density distributing means for distributing the densities of the pixels within the multi-level pixel block when the detecting means has detected a pixel having a density not exceeding the predetermined threshold; and printing means for printing a tonal image in accordance with the respective multi-level pixel data within the multi-level pixel block selected by the selecting means.

The other objects, features and advantages of the present invention will become apparent from the following detailed description, taken in conjunction with the accompanying drawings.

BRIEF DESCRIPTION OF THE DRAWINGS

FIGS. 7A to 7D are views showing other examples of the pattern of dot concentration;

FIGS. 8A and 8B are views which serve to illustrate the relationship between an input pixel signal and an output pixel signal of the dot concentrating circuit of FIG. 2;

FIGS. 15A to 15C are views which serve to illustrate the relationship between an input pixel signal and an output pixel signal of the dot concentrating circuit of FIG. 2

DESCRIPTION OF THE PREFERRED EMBODIMENTS

Embodiments of the present invention are explained in detail with reference to the accompanying drawings.

Figure 1:
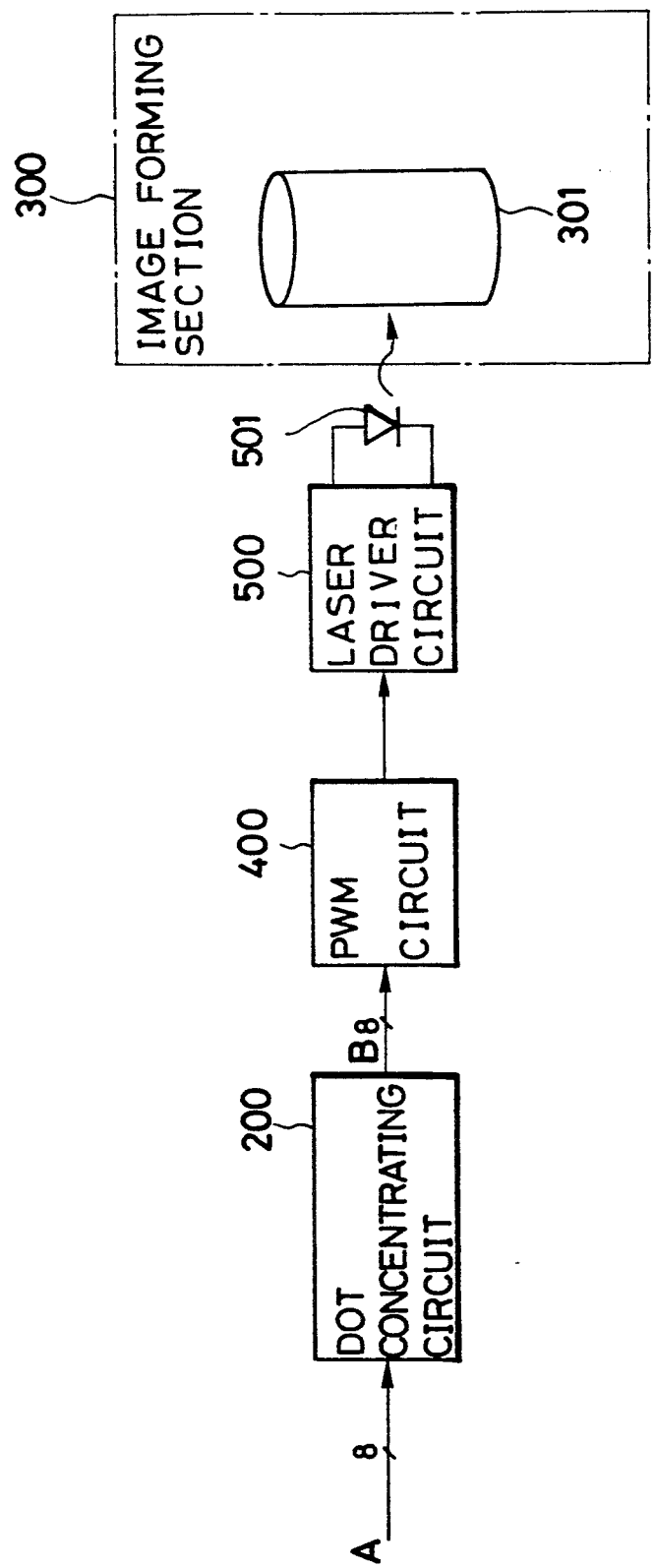
FIG. 1 is a block diagram showing a laser beam printer to which one embodiment of the present invention is applied.

FIG. 1 is a block diagram showing the general construction of a laser beam printer to which is applied one embodiment of the present invention.

Figure 10:
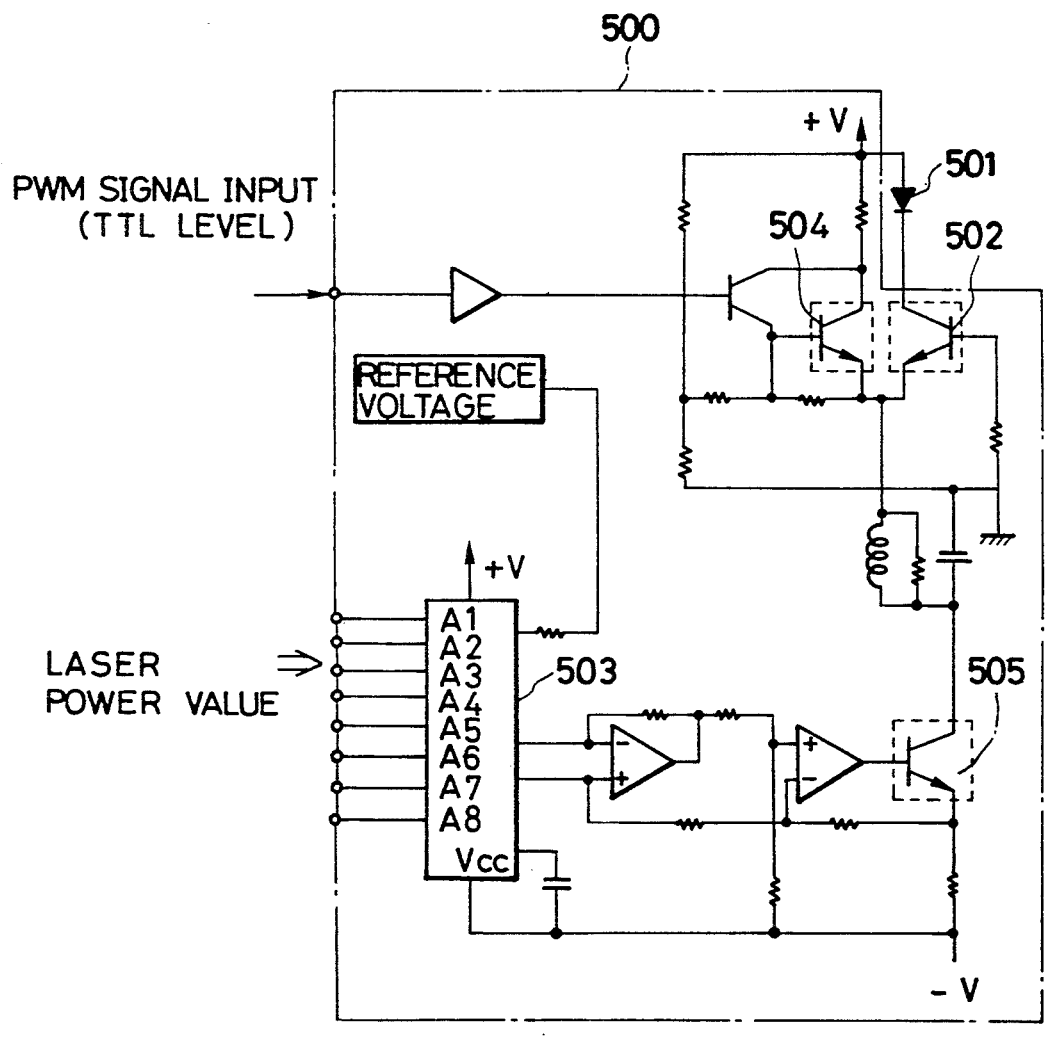
FIG. 10 is a circuit diagram of the laser driver circuit incorporated in the apparatus according to the embodiment FIG. 1.
Figure 11:
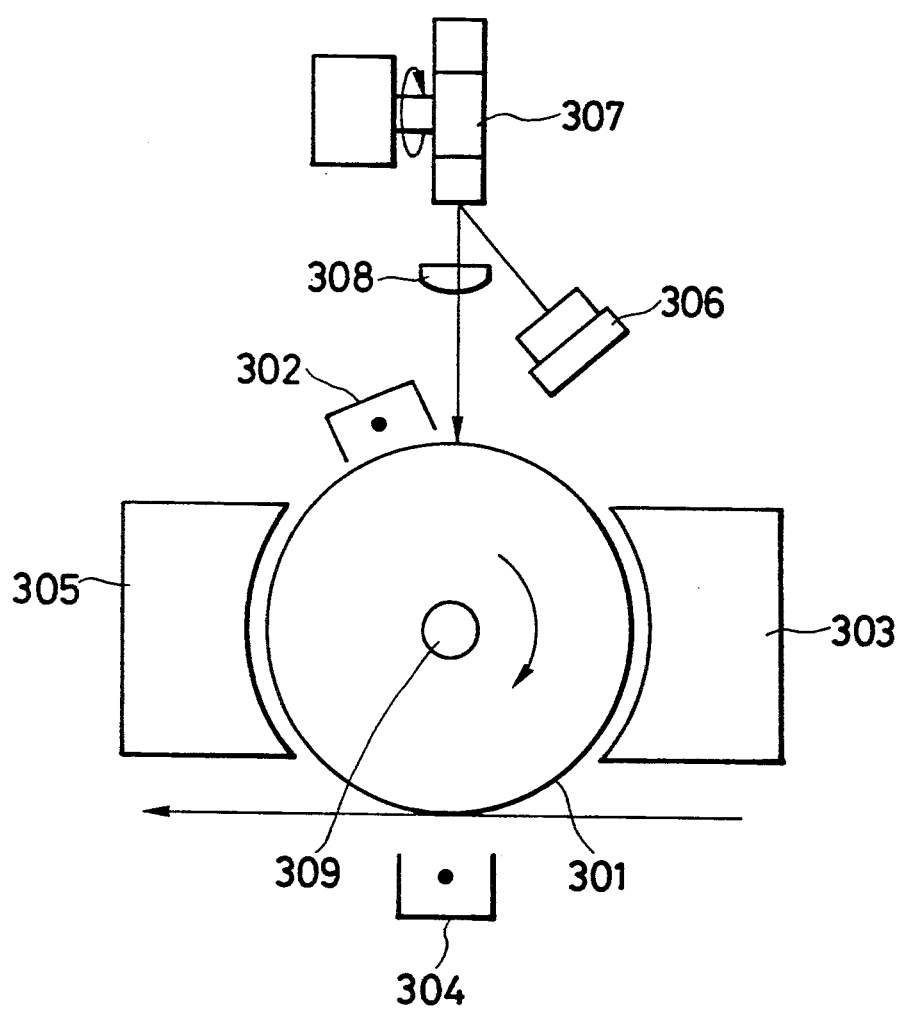
FIG. 11 is a schematic view showing a printer mechanism of the electrophotographic type which is incorporated in the apparatus according to the embodiment FIG. 1.
Figure 12:
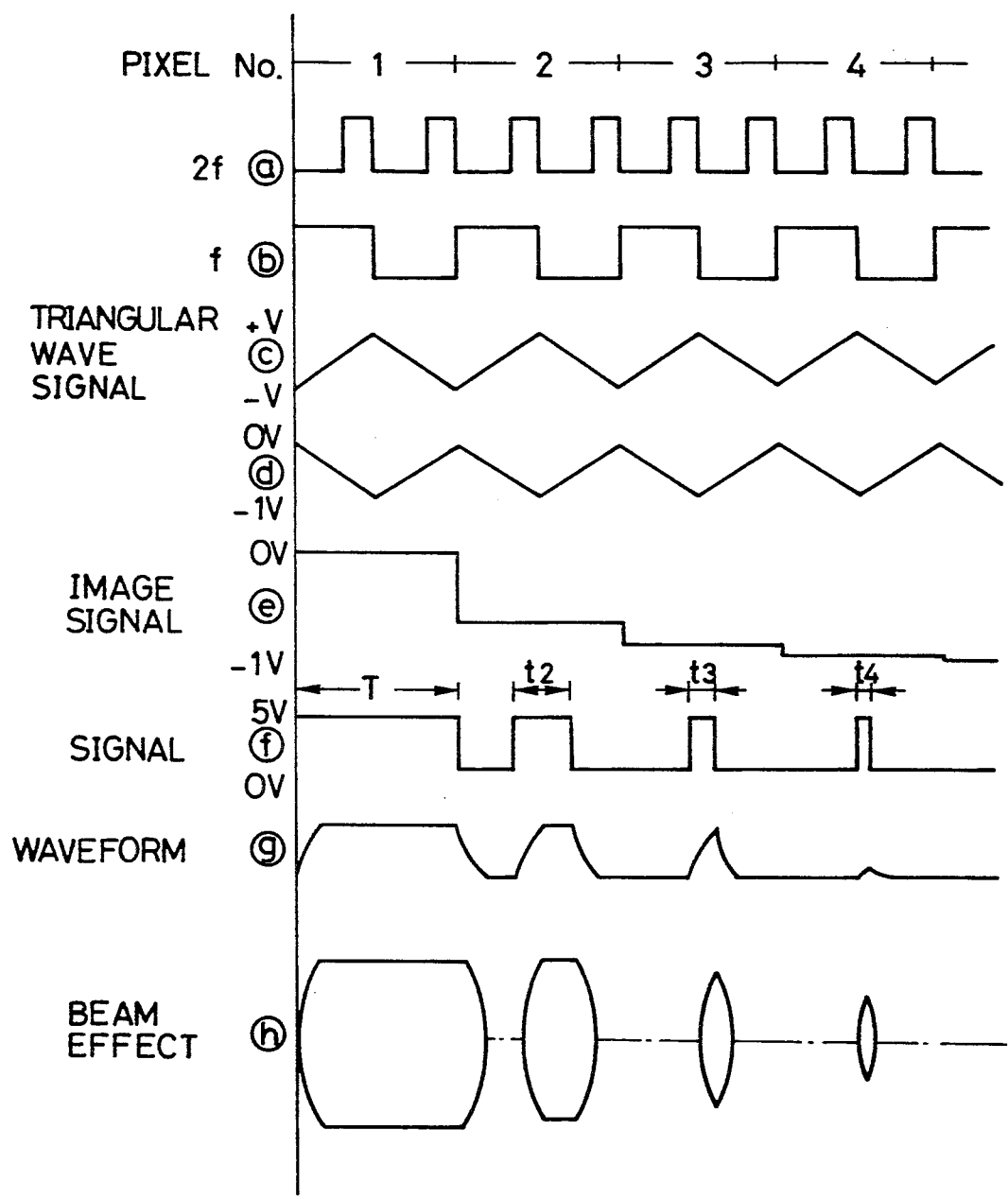
FIG. 12 is a timing chart showing the operation of the PWM circuit.
Figure 13:
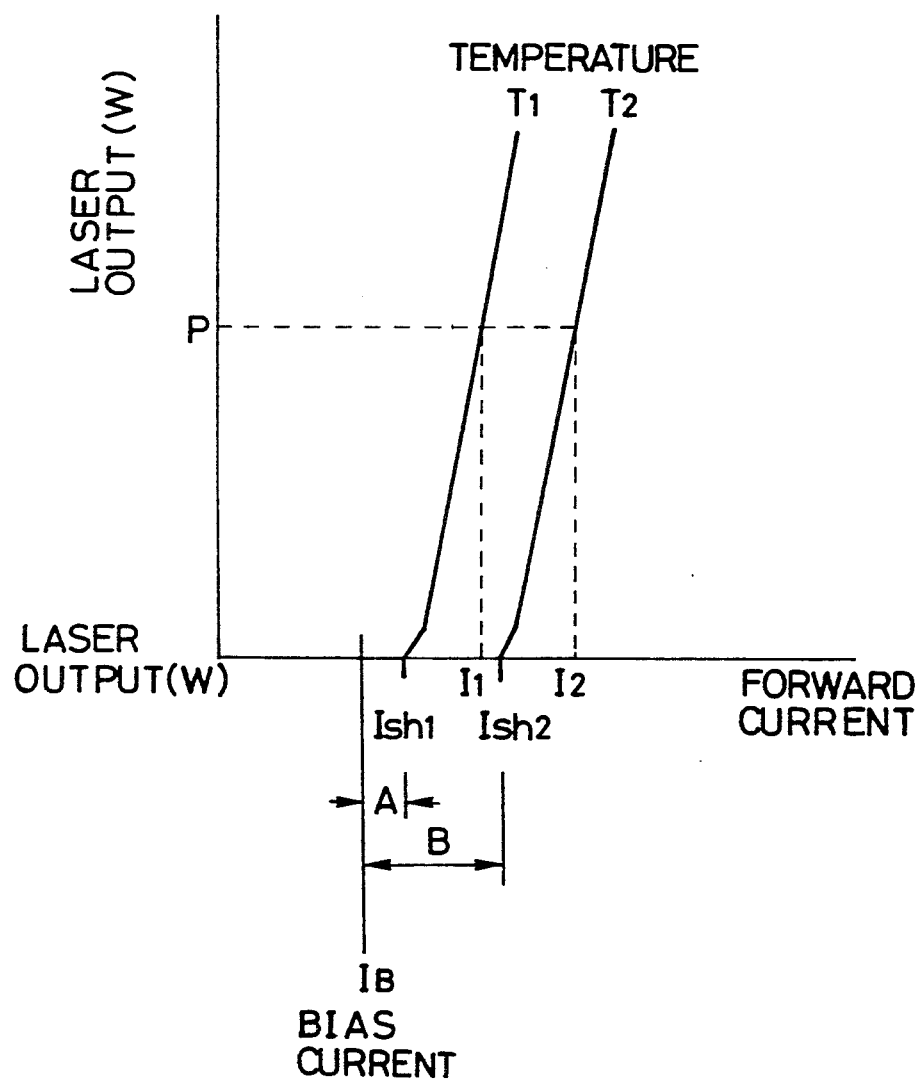
FIG. 13 is a graphic representation showing the characteristics of one example of a semiconductor laser.

In the figure, reference numeral 200 denotes a dot concentrating circuit for concentrating dots (pixels) in a certain m×n matrix, m and n being positive integers not both equal to 1. (The details of this circuit will be described later with reference to FIG. 2.) This m×n matrix, which is formed as a single entity, is hereinafter referred to as a "pixel block". A PWM circuit for effecting pulse width modulation of an image signal is denoted by 400, a laser driver by 500, and a semiconductor laser device by 501. Reference numeral 300 denotes an image forming section which includes a photosensitive drum 301. The PWM circuit 400, the laser driver circuit 500 and the image forming section 300 have the structures explained in connection with FIGS. 9, 10 and 11, respectively.

In such construction and arrangement, an 8 bit input signal A which corresponds to tone representation in 256 steps is converted into an 8 bit output image signal B of the form suitable for use in the laser beam printer utilizing a PWM method. This image signal B is input to the PWM circuit 400, and the output from the PWM circuit 400 is supplied to the image forming section 300 through the laser driver circuit 500 and the semiconductor laser device 501.

FIG. 8A shows image data input to the dot concentrating circuit 200, for example, image data (containing corrected data) transferred from an external host computer, an image reader or the like. FIG. 8B is a view showing an example of data which has been converted in units of 2×2 matrices on the basis of the input image data by the dot concentrating circuit 200, and shows image data which is converted so as to complement the tone reproduction of a highlight portion in an image formed by the laser beam printer utilizing the PWM method. The numerical value indicated in each of the illustrated meshes denotes the density of the corresponding pixel.

The conversion process which is executed by the dot concentrating circuit 200 is explained with reference to FIGS. 8A and 8B. For the sake of simplicity of the explanation, it is assumed that the minimum pulse width $t_3$ based on PWM, which enables the laser beam printer according to the embodiment of the present invention to yield stable density, is set to 10 ns and that the value of each density threshold C, D is "30", where "30" is a numerical value represented in the decimal system.

In the explanation which will be given with reference to FIGS. 8A and 8B, it is assumed that the minimum matrices used for comparison between pixel densities are 2×2 matrices which consist of $[G_{11}, G_{12}, G_{21}, G_{22}]$, $[G_{13}, G_{14}, G_{23}, G_{24}]$, $[G_{15}, G_{16}, G_{25}, G_{26}]$, . . . , respectively.

In FIG. 8A, the density of the input pixel $G_{11}$ in the matrix $[G_{11}, G_{12}, G_{21}, G_{22}]$ is "10". It will therefore be found that, because 10 < threshold C (=30), even if this pixel is subjected to a PWM process, it is in effect impossible to form a visible image with a density corresponding to the density of the pixel $G_{11}$. For this reason, if at least one pixel within a particular matrix has a density smaller than the threshold C, the densities of all the pixels in that matrix are added, together and the quotient obtained by dividing the total by the threshold C is determined as the number N of output pixels.

For example, since the total of the densities of all the pixels $G_{11}$, $G_{12}$, $G_{21}$ and $G_{22}$ in the first matrix is 100, $$100 \div 30 = 3$$

and the number N of output pixels is therefore three.

Moreover, by dividing the total 100 by the thus-obtained number N of output pixels, it is found that the density of each of the three output pixels is 33 (with the figures to the right of the decimal point omitted). In other words, three pixels each having a density of 33 and one pixel having a density of 0 (a white pixel) are output and formed as a new 2×2 matrix consisting of a total of four pixels. These output pixels are rearranged in accordance with the priority shown in FIG. 4. In this manner, the output pixels which form the first matrix $[G_{11}, G_{12}, G_{21}, G_{22}]$ shown in FIG. 8B are obtained. By outputting this first matrix, the input image signal A can be supplied to the image forming section 300 with the density of the input image data accurately preserved.

In FIG. 8A, the densities of all the pixel signals A in the second matrix $[G_{13}, G_{14}, G_{23}, G_{24}]$ satisfy the condition A > the threshold C. Accordingly, as shown in FIG. 8B, the output pixel signals A after conversion are directly output as the output pixel signals B. The density conversion of the remaining pixels is carried out in a sequence similar to that described above.

Figure 2:
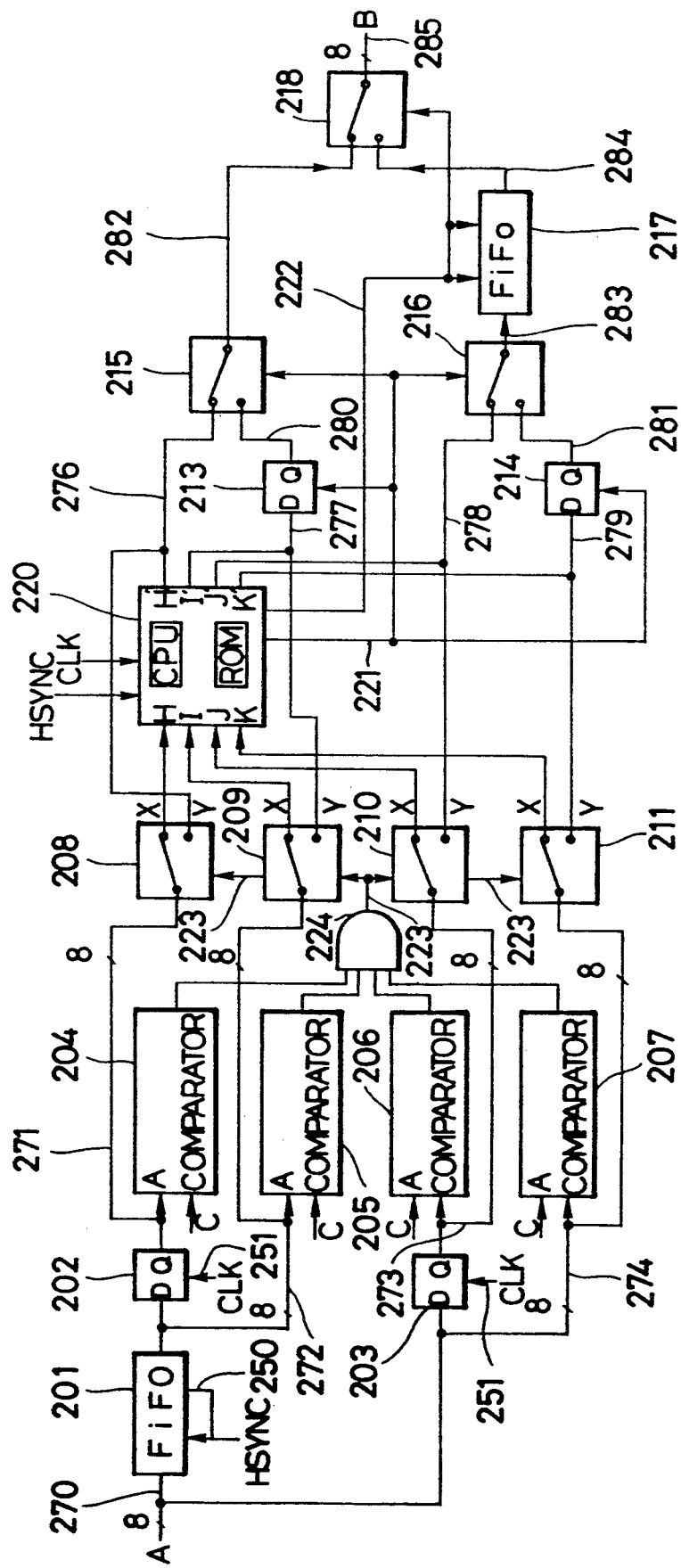
FIG. 2 is a block diagram showing one example of the dot concentrating circuit used in the embodiment of FIG. 1.

FIG. 2 is a block diagram showing the details of the dot concentrating circuit 200 in the embodiment which is arranged to realize the processes described above.

In this figure, FIFO memories 201 and 217 are employed to delay pixel data by one line. Latch circuits 202, 203, 213 and 214 are each employed to delay a corresponding pixel by one pixel. Comparators (CMP) are denoted by 204–207, selectors by 208–211, 215, 216 and 218, and a CPU by 220. Although not shown, ECL circuits are disposed at various portions for the sake of high-speed processing. Reference numeral 250 denotes a synchronizing signal (HSYNC) which is generated for each main scan line, and reference numeral 251 denotes a synchronizing signal (CLK) which is generated for each pixel. Incidentally, this HSYNC signal is based on a known form of beam detect (BD) signal supplied from the image forming section 300

In the arrangement described above, each pixel signal A (an 8 bit datum) is input as an input signal 270 every main scanning line A part of the input signal 270 is supplied to the FIFO memory 201, where it is delayed by one line, and then by another line by the latch 202. In the meantime, the other part of the pixel input signal 270 is supplied to the latch 203, where it is delayed by one line. In this manner, parallel processing of each pixel signal $A_{11}$, $A_{12}$, $A_{21}$ and $A_{22}$ in the $2 \times 2$ matrix is enabled. Timing charts of this parallel processing are shown in FIGS. 5A and 5B.

Figure 5A:
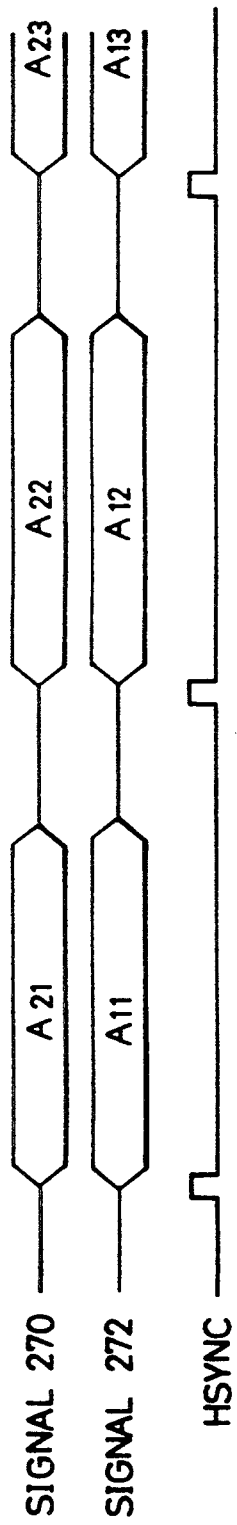
FIGS. 5A, 5B, 6A, 6B are timing charts.
Figure 5B:
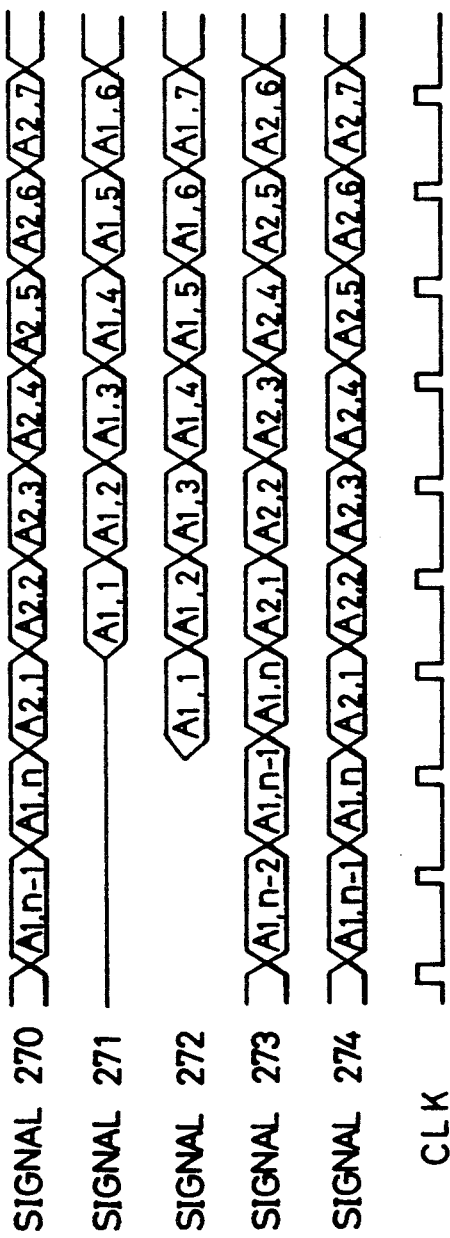

FIG. 5A shows the relationship between the input and the output of the FIFO memory 201 on the basis of the HSYNC signal. It will be understood from FIG. 5A that, in a signal 272, pixel signals $A_{1n}$ for one scanning line in the signal 270 are output after a delay corresponding to the period of the HSYNC signal (a delay of one line). FIG. 5B shows in detail this relationship on the basis of a clock signal CLK which is generated at intervals corresponding to the period of one pixel signal. As can be seen from FIG. 5B, the pixel signal 270 (or 274) to a pixel signal 273, that is, input pixel signals $A_{nn}$, $A_{n(n+1)}$, $A_{(n+1)n}$ and $A_{(n+1)(n+1)}$ which constitute the above explained $2 \times 2$ matrix are provided to the input terminals A of the respective comparators 204 to 207 at the same timing, respectively.

Then, the respective comparators 204 to 207 compare the pixel signals 271 to 274 supplied to their input terminals A with the predetermined threshold C (=30). If the condition of A>C is satisfied, the logic level provided at the output terminal of each comparator 204 to 207 is set to "1", while if A≦C, the logic level is set to "0". The results of the comparisons made by the respective comparators are supplied to the corresponding input terminals of an AND circuit 224.

Each of the selectors 208 to 211 provides its input pixel data at one of output terminals X and Y thereof in accordance with the logic level of the output signal 223 from the AND circuit 224. Specifically, if the logic level of the output signal 223 from the AND circuit 224 is "1", the input pixel data is provided at the output terminal Y, while if the logic level is "0", the input pixel data is provided at the output terminal X.

More specifically, if the values of all the pixel signals in the $2 \times 2$ matrix satisfy the condition A>C, the values of the respective pixels are provided at the output terminals Y of the corresponding selectors. However, if the matrix contains at least one pixel which does not satisfy the condition A>C, the respective pixels are provided at the output terminals X of the corresponding selectors and then supplied to the input terminals H to K of a CPU 220.

Figure 3:
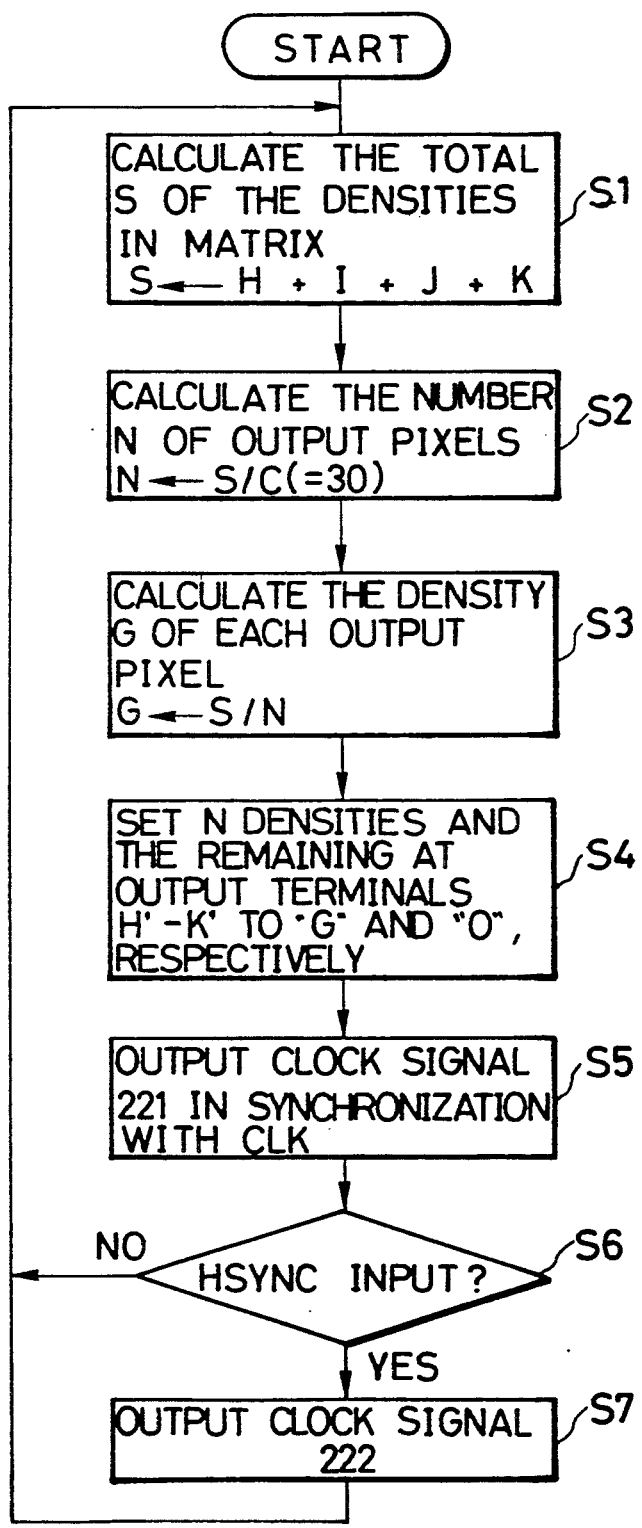
FIG. 3 is a flow chart showing the algorithm of the CPU used in the embodiment of FIG. 1.

The process executed by the CPU 220 is explained with reference to the flow chart of FIG. 3. A program which defines the sequence of the process is stored in a memory of the CPU 220, and the program is initiated when particular pixel values are provided to the input terminals H to K. For example, the program may be set so that it can start the process when the level of the output signal 223 of the AND circuit 224 goes to "1".

First of all, in Step S1, the CPU 220 adds all the data supplied to its input terminals H, I, J and K, and obtains the total S. In Step S2, the total S is divided by the threshold C, and the integral portion of the quotient is extracted to obtain the number N of output pixels. In Step S3, the density G of each output pixel is obtained by dividing the total S by the number N of output pixels. Then, the process proceeds to Step S4, where the density G is provided at n output terminals of the output terminals H'-K', while the density "0" is provided at the remaining 4−N terminal(s). The sequence in which the output pixels are extracted is determined by the magnitudes of the numerical values indicated in each matrix shown in FIG. 4. Then, the process proceeds to Step S5, where the CPU 220 outputs a clock signal 221 in synchronization with the input signal CLK. Thus, a pixel signal 277 provided at the output terminal I' of the CPU 220 is latched by the latch circuit 213, while a pixel signal 279 provided at the output terminal K' is latched by the latch circuit 214. The respective latch circuits 213 and 214 output pixel signals 280 and 281 each of which is delayed by one pixel. In synchronization with the clock signal 221, the selector 215 alternately selects a pixel signal 276 and a pixel signal 280 to output a pixel signal 282. This pixel signal 282 is supplied to one input terminal of the selector 218. In this manner, the pixel signals which are arranged in a parallel form are again converted into a serial form. Similarly, the selector 216 alternately selects the pixel signal 278 and the pixel signal 281 to convert the parallel signal into a serial signal 283. This serial signal 283 is stored in the FIFO memory 217 for the purpose of a delay corresponding to one line.

After the CPU 220 has output the clock signal 221 in synchronization with the clock CLK in Step S5, the process proceeds to Step S6, where the CPU 220 determines whether or not it has received the HSYNC signal representing that the next line of pixel data has appeared. The process which starts with Step S1 is repeated until it is determined that the HSYNC signal has been input. If it is determined that the HSYNC signal has been input, the process proceeds to Step S7, where a clock signal 222 is output in synchronization with the HSYNC signal. In this manner, the state wherein the FIFO memory 217 is in write mode with the data from the selector 215 selected by the selector 218 is changed into the state wherein the FIFO memory 217 is in read mode in which the selector 218 selects and outputs the data from the FIFO memory 217.

Figures 6A, 6B:

FIG. 6A is a timing chart of this output operation.

As shown in FIG. 6A, the image signal B which has completely passed through density conversion is output as a group of pixel signals 276 to 279. In FIG. 6A there is shown a timing chart which serves to illustrate the first line alone as a representative example. The pixel signal 280 is a signal which is obtained by delaying pixel signal 277 by the one-clock period of the clock signal 221. The selector 215 alternately selects the pixel signals 276 and 280 to output a series of pixel signals 282 ($B_{11}$, $B_{12}$, $B_{13}$, $B_{14}$, . . . ). In FIG. 6A, the portions indicated by Xn represent signals which are not needed when the parallel pixel signals of each matrix are to be converted into serial pixel signals.

The pixel signal 283 which is obtained in a similar manner is delayed by one line by the FIFO memory 217. Each time the selector 218 receives a HSYNC signal (horizontal synchronizing signal), that is to say, for each line, the selector 218 alternately selects the pixel signal 282 and the pixel signal 284 to output a series of pixel signals 285, namely, a set of pixel signals B. More specifically, two lines of pixel signals which have been arranged in parallel within each matrix are rearranged into one series of signals so that the pixel signals are recovered to their initial state.

FIG. 6B is a timing chart which serves to illustrate this rearrangement. The FIFO memory 217 delays the pixel signal 283 by one line with respect to the pixel signal 282 and outputs the result as the pixel signal 284. In synchronization with the clock signal 222, the selector 218 alternately selects the pixel signal 282 and the pixel signal 284 to output a series of pixel signals 285 (image signal B) to the PWM circuit 400.

Thereafter, a visible image is formed by means of the PWM circuit 400, the laser driver 500 and the image forming section 300.

In the above-described embodiment, if at least one piece of pixel data in a particular 2×2 matrix has a density not exceeding the threshold C, the total of the densities of all four pixels is calculated. Then, the number N of output pixels each having a density above the threshold C is calculated from the total so that the density is uniformly distributed among the the individual output pixels. Accordingly, even if a pixel which has a density below the minimum pulse width based on PWM is found in a group of input pixel data, it is possible to preserve and output the density which has conventionally been omitted. Accordingly, unlike the conventional arrangement in which a low-density portion is output as a white image, it is possible to appropriately output such a low-density portion as a black dot, whereby an output image having a stable highlight portion can be obtained the above-described embodiment, although digits to the right of the decimal point which result from the calculations of the density of each output pixel are omitted, the total of digits to the right of the decimal point may be added to the density of one of the output pixels. If this is done, the density of an input pixel group can be accurately preserved.

A second embodiment is explained below.

In the second embodiment, the total S obtained by calculation in the first embodiment is distributed to one pixel position. However, since the maximum value which can be represented with 8 bits is "255", if the total S exceeds 255, 255 is distributed to a first-priority pixel position, and the rest (the total−255) is distributed to a second-priority pixel position. If the value to be distributed to the second-priority pixel position also exceeds 255, 255 is still distributed to this pixel position, and the rest is distributed to a third-priority pixel position.

FIG. 15A shows a set of image data input to the dot concentrating circuit 200, for example, a set of image data (containing corrected data) transferred from an external host computer, an image reader or the like.

FIG. 15B is a view showing an example of data which has been converted in units of 2×2 matrices on the basis of the input image data by the dot concentrating circuit 200, and shows image data which is converted so as to complement the tone reproduction of a highlight portion in an image formed by the laser beam printer utilizing the PWM method. The numerical value indicated in each of the illustrated meshes denotes the density of the corresponding pixel.

The conversion process which is executed by the dot concentrating circuit 200 is explained in detail with reference to FIGS. 15A and 15B. For the sake of convenience of explanation, it is assumed that the minimum pulse width $t_3$ based on PWM in the second embodiment is set to 10 ns and that the value of each of the corresponding density thresholds C and D is "30". The matrix size as a unit to be processed is 2×2 as illustrated.

In FIG. 15A, the density of the input pixel $G_{11}$ in the matrix [$G_{11}$, $G_{12}$, $G_{21}$, $G_{22}$] is "10". It will therefore be found that, because 10<threshold C (=30), even if this pixel is subjected to a PWM process, it is in effect impossible to form a visible image with a density corresponding to the density of the pixel $G_{11}$. For this reason, if at least one pixel within a particular matrix has a density smaller than the threshold C, the densities of all the pixels in that matrix are added, and the total is rearranged in accordance with, for example, the priority shown in FIG. 4. Since the total of the densities of all the pixels $G_{11}$, $G_{12}$, $G_{21}$ and $G_{22}$ in the matrix is "100", the density of the pixel $G_{11}$ is set to "100", and the density of each of the pixels $G_{12}$, $G_{21}$ and $G_{22}$ is set to that of a white-level signal (for example 0). However, if the total (=300) exceeds "255" as in the third matrix [$G_{15}$, $G_{16}$, $G_{25}$, $G_{26}$], the density of the pixel $G_{15}$ which is in the first priority is set to "255", and the value "the total−255" is set as the density of the pixel $G_{26}$ of the second priority.

In FIG. 15A, the densities of all the pixel signals A in the second matrix [$G_{13}$, $G_{14}$, $G_{23}$, $G_{24}$] satisfy the condition A>C (=30). Accordingly, as shown in FIG. 15B, the output pixel signals A after conversion are directly output as the output pixel signals B. The density conversion of the remaining pixels is carried out in a sequence similar to that described above.

Figure 14:
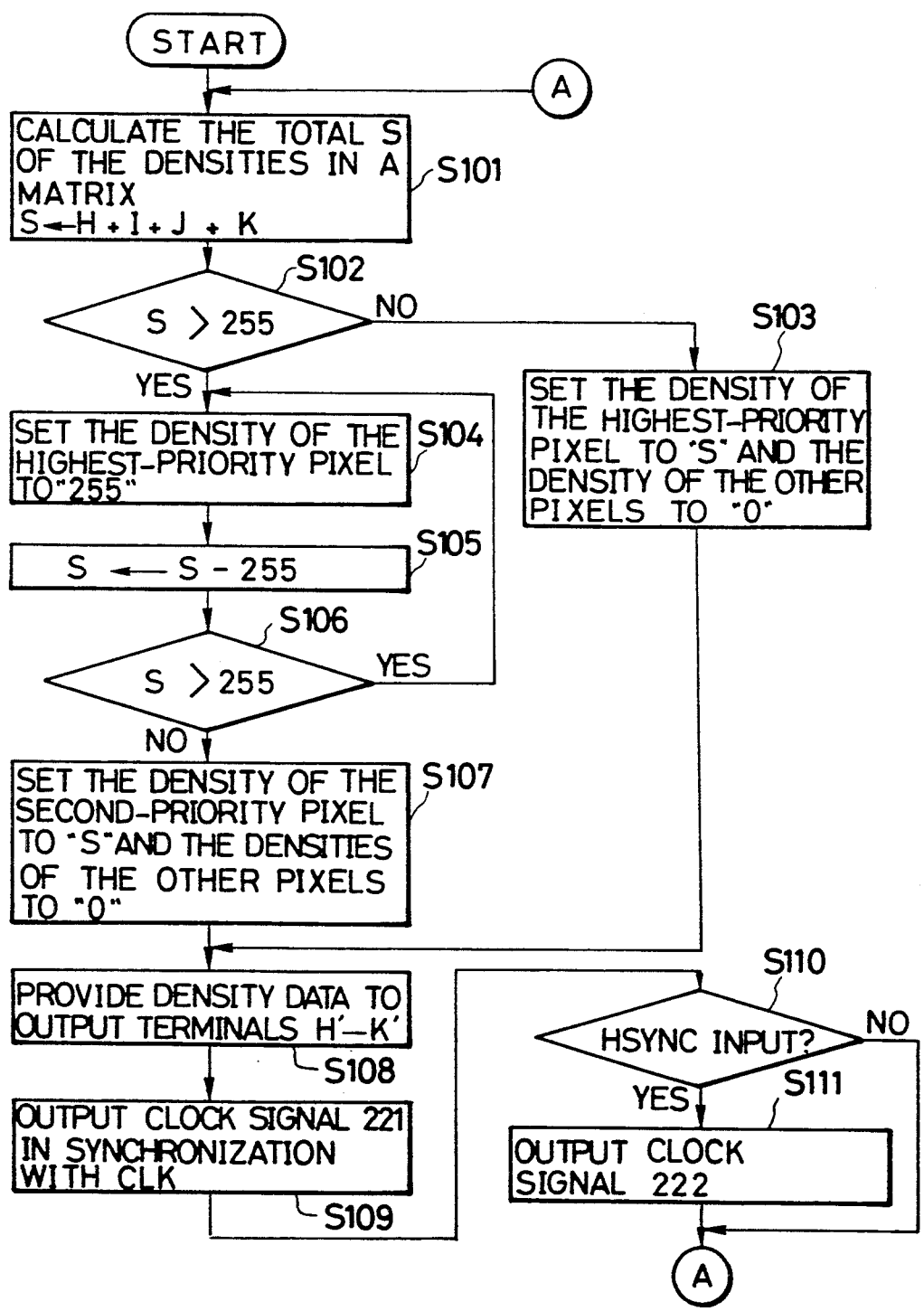
FIG. 14 is a flow chart showing the algorithm of the CPU used in another embodiment.

The above-described process can be explained with reference to the dot concentrating circuit 200 shown in FIG. 2. In this case, however, the CPU 220 executes a process according to the flow chart shown in FIG. 14. It is a matter of course that the program corresponding to the flow chart of FIG. 14 is stored in a memory of the CPU 220. The operations of the elements other than the CPU 220 are the same as those of the corresponding elements in the first embodiment and no detailed description is therefore given.

As described previously, if it is found that the density of at least one pixel in a matrix of interest is not exceeding the threshold C, density data on the individual pixels are input to the corresponding input terminals H–K of the CPU 220.

The process shown in the flow chart of FIG. 14 is initiated when the density data on the individual pixels in the matrix are supplied to the input terminals H–K.

First of all, in Step S101, the CPU 220 adds all the signals supplied to the input terminals H, I, J and K, and obtains the total S. In Step S102, whether the total S is greater than "255" is determined. If it is smaller than "255", the process proceeds to Step S103, where the value at the pixel position of the highest priority is replaced by the total S and the values of the remaining pixels are set to "0".

Figure 4:
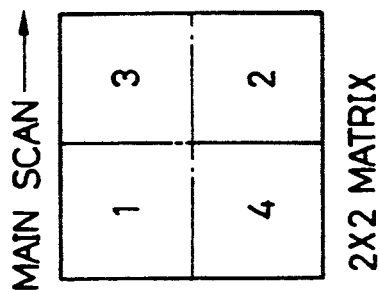
FIG. 4 is a view showing the pattern of dot concentration in a 2×2 matrix according to the embodiment of FIG. 1.

If it is determined in Step S102 that the total S is greater than "255", the process proceeds to Step S104, where the value of the pixel of the first priority is set to "255" in accordance with the flow of FIG. 4. In the next step S105, the distributed value "255" is subtracted from the total S. Then, in Step S106, whether the updated value S is greater than "255" is determined. If it is determined that S is greater than "255", the process returns to Step S104, where the density of the pixel of the highest priority from among the pixels other than the pixel to which the density was distributed in the preceding step is set to "255".

If it is determined that the updated value S is not greater than 255, the process proceeds to Step S107, where the density of the pixel of the highest priority after the pixel to which the density was distributed in the preceding step is replaced by S. At this time, "0" is distributed to the remaining pixels to which no density has been distributed.

In Step S108, the densities of the respective pixels, determined in the aforesaid process, are provided at the output terminals H' to K'. The pixel values corresponding to the individual input terminals H to K are supplied to the respective output terminals H' to K'. The process proceeds to Step S109, where the CPU 220 outputs the clock signal 221 in synchronization with the input signal CLK. Thus, the pixel signal 227 provided at the output terminal I' is latched by the latch circuit 213, while the pixel signal 279 provided at the output terminal K' is latched by the latch circuit 214. The respective latch circuits 213 and 214 output the pixel signals 280 and 281 each of which is delayed by one pixel. In synchronization with the clock signal 221, the selector 215 alternately selects the pixel signal 276 and the pixel signal 280 to output the pixel signal 282. This pixel signal 282 is provided to one input terminal of the selector 218. In this manner, the pixel signals which are arranged in a parallel form are again converted into a serial form.

In Step S109, whether or not the HSYNC signal has been input is determined. The above-described process which starts with Step S101 is repeated until it is determined that the HSYNC signal has been input. If it is determined that the HSYNC signal has been input, the clock signal 222 is output in synchronization with the HSYNC signal. In this manner, the state wherein the FIFO memory 217 is in write mode in which the selector 218 selects the data from the selector 215 is changed into the state wherein the FIFO memory 217 is in read mode in which the selector 218 selects and outputs the data from the selector 217. The timing chart of this output operation is as shown in each of FIGS. 6A and 6B, being the same that explained in connection with the first embodiment.

Thereafter, a visible image is formed by means of the PWM circuit 400, the laser driver 500 and the image forming section 300.

In accordance with the second embodiment described above, it is possible to solve, for example, the problem that, if the density of each input pixel does not exceed the threshold C, no black dot is printed out. This is because, even if the density of each input pixel data is below the threshold C, the total of the densities is distributed to at least one pixel position.

A third embodiment is explained below.

In the third embodiment, output pixel data such as that shown in FIG. 15C is generated from the input pixel data shown in FIG. 15A.

FIG. 15C shows a case where, if at least one pixel having a density not exceeding the threshold C is present in a particular matrix, the value of this pixel is added to the value of another pixel.

In the first matrix $[G_{11}, G_{12}, G_{21}, G_{22}]$ shown in FIG. 15A, "10"—the density of the input pixel $G_{11}$,—does not exceed the threshold C (=30). Accordingly, this value is added to the minimum density (=20) of the pixel $G_{21}$ from among the remaining pixels.

Similarly, in the first matrix $[G_{15}, G_{16}, G_{25}, G_{26}]$ shown in FIG. 15A, "20", namely, the density of the pixel $G_{16}$ not exceeding the threshold C, is added to the minimum density (=70) of the pixel $G_{26}$ from among the other pixels in the matrix. In this manner, the matrices shown in FIG. 15C are obtained. With this third embodiment, it is possible to achieve advantages and effects similar to those of each of the aforesaid embodiments.

Any of the first to third embodiments has been explained with illustrative reference to the example in which pixel signals are processed in units of 2×2 matrices. However, the matrix size usable in the present invention is not limited to 2×2 alone, and is applicable to m×n matrices, m and n being positive integers not both equal to 1. For instance, it is of course possible to utilize various forms of matrices including a plurality of pixels as shown in each of FIGS. 7A to 7D. The numerical value indicated in each mesh in each of the matrices represents the priority of the corresponding pixel when the pixels are processed. In the case of, for example, a 2×2 matrix, only pixel signals each having a density not exceeding the threshold C (for example, 30) may be added and output in the following manner:

$$\begin{pmatrix} 40 & 30 \\ 20 & 20 \end{pmatrix} \rightarrow \begin{pmatrix} 40 & 30 \\ 40 & 0 \end{pmatrix}$$

It is apparent that such an arrangement does not depart from the present invention.

Each of the above embodiments has been explained with reference to the example in which the minimum pulse width $t_3$ of the PWM signal from which a visible image is generated is 10 ns (=30), but the range of applications of the present invention is not limited to such an example. It will be appreciated that, if this threshold is set as a variable, it is possible to realize even finer density control.

Reference has been made to the example in which the dot concentrating circuit 200 for performing the above-described process is incorporated in the laser beam printer, but the dot concentrating circuit 200 may of course be installed as an independent apparatus. In this arrangement, if the present apparatus is designed so that a threshed corresponding to the minimum PWM width on the printer side can be manually set, the apparatus can be connected to a different printer and a good printout can be obtained.

The above explanation has been given with illustrative reference to the laser beam printer employing an electrophotographic process, but, needless to say, the present invention can be applied to various types of printers such as thermal printers without being limited to the laser beam printer alone.

In each of the embodiments, the CPU 220 effects distribution of density in accordance with its program. However, since data values to be provided at the output terminals H' to K' are primarily determined by the data values supplied to the respective input terminals H to K, a ROM containing a look-up table 32 of the type which receives a 32 bit address input to provide a 32 bit data output may be employed in place of the CPU 220. However, this arrangement is limited to a case where one pixel is represented by 8 bits (with tone representation in 255 steps). If one pixel is to be represented by the number bits other than 8, a look-up table may be formed with a ROM having address inputs and data outputs corresponding to the number of pins required.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   dividing means for dividing input multi-level image data into blocks, each of which has a plurality of pixels;
   comparing means or comparing, for each block, data of a plurality of pixels in the block with a predetermined datum;
   converting means for converting data of a plurality of pixels in the block in accordance with a comparison result obtained by said comparing means and for concentrating a density of the block to a predetermined position in the block; and
   output means for outputting multi-level pixel data converted by said converting means.

2. An image processing apparatus according to claim 1, further comprising pulse-width modulating means for pulse-width modulating the pixel data converted by said converting means.

3. An image processing apparatus according to claim 2, further comprising image forming means for forming an image on a recording medium based upon pixel data modulated by said pulse-width modulating means.

4. An image processing apparatus according to claim 3, wherein the predetermined datum is a minimum density that can be reproduced by said image forming means.

5. An image processing apparatus according to claim 3, wherein said image forming means comprises a laser beam printer which is arranged to form a halftone image by generating a beam of light for a time period corresponding to the output multi-level pixel data, the predetermined datum corresponding to a minimum time period required to generate the beam of light.

6. An image processing apparatus according to claim 1, wherein said converting means further comprises adding means for adding a density of any pixel not exceeding the predetermined datum to a density of another pixel in the block.

7. An image processing apparatus according to claim 1, wherein said converting means further comprises:
   first calculating means for calculating a total of the densities of the respective pixels within the block;
   second calculating means for calculating a number of output pixels from the total calculated by said first calculating means; and
   third calculating means for calculating a density to be concentrated to the output pixels a number of which has been calculated by said second calculating means.

8. An image processing apparatus according to claim 1, wherein said converting means further comprises distributing means for distributing a density of any pixel having a density not exceeding the predetermined datum to other pixels in a block which other pixels each have at least a predetermined minimum density.

9. An image processing apparatus according to claim 1, wherein said converting mean further comprises:
   calculating means for calculating a total of densities of respective pixels within a block;
   determining means for determining whether or not the total density calculated by said calculating means has exceeded a second predetermined datum;
   first distributing means for distributing the total density to a particular pixel position in the block when the total density has not exceeded the second predetermined datum; and
   second distributing means for distributing a value equal to the second predetermined datum to said particular pixel position in the block when the total density has exceeded the second predetermined datum and for distributing any remaining density to a pixel position next to said particular pixel position in accordance with a predetermined sequence.

10. An image processing apparatus according to claim 1, wherein the block is n×m pixels in size, n and m being positive interger not both equal to 1.

11. An image processing apparatus comprising:
    dividing means for dividing input multi-level image data into a plurality of blocks, each of which has a plurality of pixels;
    comparing means for comparing data of a plurality of pixels in each block with a predetermined datum;
    converting means for converting data of a plruality of pixels in the block in accordance with the comparison obtained by said comparing means and concentrating a density of the block to a predetermined position in the block; and
    pulse-width modulating means for pulse-width modulating the pixel data converted by said converting means.

12. An image processing method, comprising the steps of:
    dividing input multi-level image data into a plurality of blocks;
    comparing data of each of a plurality of pixels in the block with a predetermined datum;
    converting data of a plurality of pixels in the block in accordance with the comparison result obtained in said comparing step and concentrating a density of the block to a predetermined position in the block; and
    outputting converted multi-level pixel data obtained in said converting step.

13. An image processing method according to claim 12, further comprising the step of pulse-width modulating the converted multi-level pixel data.

14. An image processing method according to claim 13, further comprising the step of forming an image on a recording medium based upon pulse-width modulated pixel data formed in accordance with the converted multi-level pixel data.

15. An image processing method according to claim 12, wherein the block is n×m pixels in size, n and m being positive integers not both equal to 1.

* * * * *

UNITED STATES PATENT AND TRADEMARK OFFICE
CERTIFICATE OF CORRECTION

PATENT NO. : 5,148,287

DATED : September 15, 1992

INVENTOR(S) : KAZUHISA KEMMOCHI, ET AL.

Page 1 of 2

It is certified that error appears in the above-identified patent and that said Letters Patent is hereby corrected as shown below:

ON THE TITLE PAGE,
IN [56] REFERENCES CITED

Under FOREIGN PATENT DOCUMENTS:
"43-16199  7/1965  Japan ." should read
--43-16199  7/1968  Japan .--.

SHEET 8 OF 14

Figure 9:
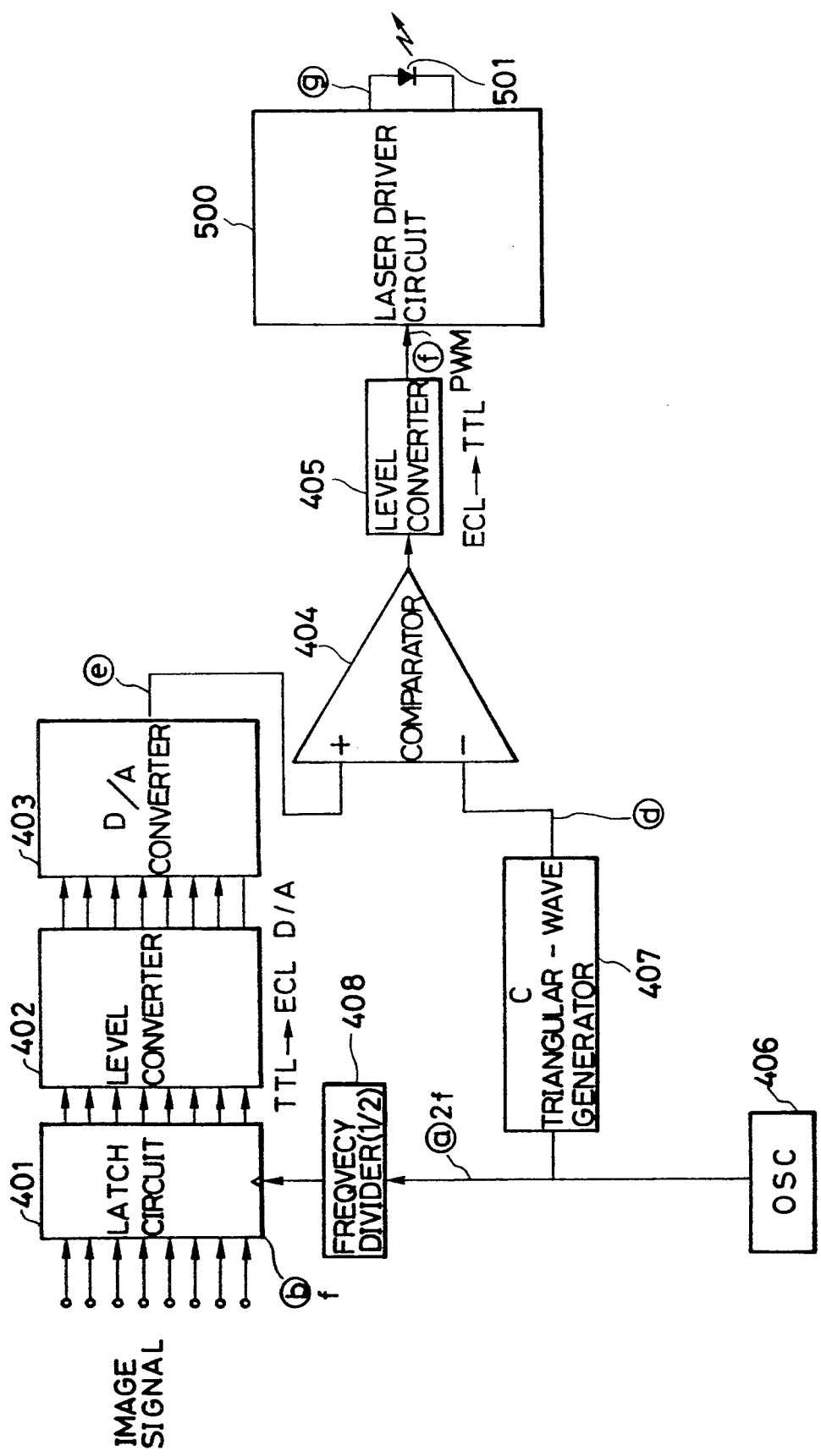
FIG. 9 is a circuit diagram of the PWM circuit incorporated in the apparatus according to the embodiment FIG. 1.

FIG. 9, "FREQVECY" should read --FREQUENCY--.

COLUMN 3

Line 8, "notation" should read --notation.--.

COLUMN 7

Line 23, "line" should read --line.--.

COLUMN 9

Line 45, "obtained" should read --obtained.--.
Line 46, "the above-described" should read
   --In the above-described--.

COLUMN 13

Line 25, "or" should read --for--.
Line 62, "the" should be deleted.
Line 63, "the" (first occurrence) should be deleted.

UNITED STATES PATENT AND TRADEMARK OFFICE
CERTIFICATE OF CORRECTION

PATENT NO.  : 5,148,287
DATED       : September 15, 1992
INVENTOR(S) : KAZUHISA KEMMOCHI, ET AL.

It is certified that error appears in the above-identified patent and that said Letters Patent is hereby corrected as shown below:

<u>COLUMN 14</u>

Line 36, "plruality" should read --plurality--.

Signed and Sealed this

Twelfth Day of October, 1993

Attest:

BRUCE LEHMAN

Attesting Officer    Commissioner of Patents and Trademarks